United States Patent [19]

Smit

[11] Patent Number: 4,713,526
[45] Date of Patent: Dec. 15, 1987

[54] RESERVOIR FILLING ARRANGEMENT FOR A COFFEE MACHINE

[75] Inventor: Gerard C. Smit, Amerongen, Netherlands

[73] Assignee: Smitdesign B.V., Amerongen, Netherlands

[21] Appl. No.: 909,682

[22] Filed: Sep. 22, 1986

[51] Int. Cl.4 .................. A47J 31/00; H05B 1/00; F24H 1/00

[52] U.S. Cl. .................. 219/332; 219/333; 99/283; 99/300; 99/305; 99/307

[58] Field of Search .............. 219/308, 332, 333; 99/283, 300, 302 R, 305, 307

[56] References Cited

U.S. PATENT DOCUMENTS

4,192,227  3/1980  Petry ........................... 99/300 X
4,581,239  4/1986  Woolman et al. ............ 99/302 R X
4,644,855  2/1987  Woolman et al. ............ 99/302 R X

Primary Examiner—Patrick R. Salce
Assistant Examiner—Emanuel Todd Voeltz
Attorney, Agent, or Firm—Irwin C. Alter

[57] ABSTRACT

A control device for a valve (8) in the water supply conduit (7) of a reservoir (1), e.g. the water reservoir of a coffee machine, comprising a diaphragm (10) disposed in a reservoir wall and having an operating stud (11) for a tilting member (12, 40) swivelling between two end positions, the tilting member being associated with a bistable switch. The tilting member (12, 40) is retained in one, first end position by magnetic force (15), and is then in the path of motion of the operating stud (11). The swivelling movement of the tilting member (12, 40) to the other, second end position is used for operating a microswitch (18) incorporated in the control circuit of the valve (8).

15 Claims, 19 Drawing Figures

RESERVOIR FILLING ARRANGEMENT FOR A COFFEE MACHINE

The present invention relates to a control device for a valve in the water supply conduit of a reservoir, e.g. the water reservoir of a coffee machine.

Especially in coffee machines for use in canteens, coffee shops and the like, the water reservoir of which has a capacity of 0.5 gallon or 1.8 1, and which is connected directly to the water supply by means of a valve, there is need for an automatic filling arrangement in the sense that only a switch or the like need be operated to fill the reservoir automatically.

It is an object of the present invention to provide such a control device which at the same time enables the reservoir to be filled only partly, and which, moreover, provides for the possibility of filling the reservoir manually by pouring water therein from a jug.

To this end, the control device according to the present invention is characterized by a diaphragm provided in the reservoir wall, and having an operating stud for a tilting member swivelling between two end positions, said member being associated with a bistable switch, said tilting member being retained in the one, first end position by magnetic force and then being in the path of motion of said operating stud, the swivelling movement of the tilting member to the other, second end position being used for operating a microswitch incorporated in the control circuit of the valve.

Such a bistable switch has the advantage that as soon as the force on the tilting member, determined by the water level in the reservoir and exerted by the diaphragm through the operating stud, has reached the value necessary for overcoming the magnetic force, the tilting member abruptly swivels to the other end position. By using such a switch with a switching time approaching zero, there can be obtained, even when the reservoir is filled quickly, an accurately timed interruption of the filling and hence a reliable optimum filling of the reservoir without the risk of overflow or incomplete filling.

In a further elaboration of the present invention, the swivelling movement of the tilting member can be converted into an operating movement for the microswitch by impact of the tilting member on the top end of an axially guided switching pin movable beteen two levels, said pin carrying an operating cam for the push knob of the microswitch and being movable to either switching position by manual operation.

It is thus possible to manually move the operating stud to the highest position, thereby also bringing the tilting member in the first end position wherein it is attracted by the magnet. In this position of the switching pin, the microswitch is set to close the supply circuit of the valve constructed as an electromagnetic shut-off device in the supply conduit of the water reservoir, so that this valve is opened and water flows from the conduit into the reservoir. When the maximum filling level is reached, the hydrostatic pressure on the diaphragm will cause deflection of said diaphragm, whereby the operating stud presses the tilting member away from the magnet, pressing on the top end of the switching pin, which as a result, will return to its low position. The microswitch is thus set to interrupt the supply circuit of the electromagnetic valve, which then shutss off the water supply.

This arrangement not only allows a highly reliable, simple, automatic interruption, requiring no maintenance, of the water supply to a reservoir, but also provides for the possibility to interrupt the water supply manually at any desired moment. This only requires that the switching pin is pressed downwards manually, with the tilting member remaining in the first end position fixed by the magnet, ready for the next filling of the reservoir.

In a coffee machine having a through-flow heater, according to the invention, in the low position of the switching pin, the microswitch can be set to switch on the through-flow heater.

This circuit may incorporate switches that signalize the correct position of the coffee filter and the presence of the coffee pot below the filter in the sense that, when the machine is entirely ready for making coffee, the downward movement of the switching pin not only shuts off the water supply to the reservoir but also initiates the coffee making cycle.

According to the present invention, the switching pin may further be provided with a cam and the microswitch may include a cam follower roller mounted on the end of a leaf spring through which pressure can be exerted on the push knob of the microswitch, with the switching pin being retained in the highest position by resilient engagement of said roller in an annular groove in the operating cam.

This construction ensures a reliable operation of the microswitch in that the vertical movement of fall of the switching point is hindered minimally by the friction to be overcome. The position of the annular groove in the operating cam should be chosen such that the pressure force exerted by the diaphragm on the switching pin through the tilting member ensures that the cam follower roller moves out of the annular groove.

According to the present invention, the tilting member may be constructed as a right-angled lever which in the first end position has one arm extending substantially vertically towards the magnet and the other arm extending horizontally over the top end of the switching pin. In such an embodiment of the tilting member, as soon as the arm first mentioned has been released from the magnet by the operating stud of the diaphragm, the horizontally directed pressure force of the diaphragm can be converted into a vertical pressure force on the switching pin in a simple manner.

For manual operation of the switching pin, this may be provided with two stops for the end extending between said stops of a switching lever pivotal about a horizontal axis and biased to a mid-position clear of both stops. Through operation of the other end, the lever can move the switching pin to either end position and, when released, is automatically returned to its mid-position wherein it does not hinder the free fall of the switching pin in any way whatever.

Such a bi-directional return force on the lever can be exerted by a single spring in the form of a bent spring having free ends enclosing an acute angle and fixing a lever end between them.

For the accurate setting of the force of attraction of the magnet on the tilting member, the magnet may be slidable towards and away from the swivel axis of the tilting member. In this way the filling level at which the supply has to be discontinued, can be set and adjusted accurately.

In a variant embodiment of the control device, which is of low overall height and has fewer moving parts, according to the present invention, the swivelling movement of the tilting member can be converted into an operating movement of the microswitch through an operating member connected to said tilting member for the push knob of the microswitch.

In this manner, the switching pin can be dispensed with and the microswitch can be mounted at the level of the tilting member.

The operating member may be a control cam coacting with a cam follower roller mounted on the end of a leaf spring via which pressure can be exerted on the push knob of the microswitch. During the swivelling movement of the tilting member, the control cam swivels along with it and owing to the form of the camming surface of the cam, the follower roller moves horizontally, thus switching the microswitch.

In a different variant embodiment of the control device the operating member is a portion projecting from the tilting member, which portion, during the swivelling movement of the tilting member, comes into contact with the push knob of the microswitch, depressing said knob, while the tilting member is retained in the second end position by a second magnet ensuring that the push knob remains depressed.

In these variant embodiments without a switching pin, for the manual operation of the control device, the tilting member may be provided with a carrier portion extending in spaced parallel relationship to the swivel axis between a forked upwardly directed end portion of a rocking shaft that is reciprocatingly rotatable, against spring bias, from a mid-position, wherein the fork tines are spaced from the carrier position, for moving the tilting member to either of the end positions by means of the forked end portion and the carrier portion of the tilting member.

In a preferred embodiment of the present invention, the control device comprises an open, troughed housing in which the tilting member, consisting of a unit of a rear wall and two side walls, is journalled by means of a swivel shaft, one side wall having a free edge region constructed as an operating cam face for a cam follower roller connected via a leaf spring to a microswitch also mounted in the housing. Upon tilting movement of the tilting member, initiated by the operating stud of the diaphragm, the follower roller passes over the operating cam face from a position wherein the leaf spring operates the push knob of the microswitch to a position wherein the push knob is released.

For hand-operation of the tilting member in both swivelling directions, in this embodiment, the housing incorporates a switch shaft with a hand grip carrying two swivel pawls, one of which load the switch shaft to a mid-position in cooperation with a return spring and the other of which is arranged to act on the tilting member by means of a portion engaging, with clearance, between the rear wall of the tilting member and a lip extending upwardly from a side wall thereof, spaced from the rear wall.

In addition to the low height in comparison with the embodiment with the switching pin, these variant embodiments have the additional advantage that the mounting of the assembly of reservoir with diaphragm, operating stud, magnet, tilting member and microswitch is simpler, since said assembly can be lowered into a housing wherein the operating lever with knob has already been mounted on the outside, while the carrier portion of the tilting member positions itself automatically between the upwardly extending tines of the forked end portion of the operating shaft.

It is observed that U.S. Pat. No. 3,141,077 discloses, per se, a switching device responsive to pressure variations, comprising a diaphragm which at increased pressure can exert a force on a tilting member swivelling between two end positions, said member being associated with a bistable switch. In that arrangement the tilting member is retained in the one, first end position by magnetic force and is then in the path of motion of the power transmitting means connected to the diaphragm, while the swivelling movement of the tilting member to the other, second end position is used for operating a switch. This known switching device, however, is highly complicated because a large number of springs are used, on the one hand as part of the power transmitting means from the diaphragm to the tilting member and on the other hand for resetting the tilting member when the pressure on the diaphragm falls below a predetermined level. In the framework of the present invention, wherein the control device is used for operating a valve and wherein a return movement of the tilting member may not be effected automatically, the prior art bistable switch cannot be employed. Moreover, the transmission of forces by means of springs has the drawback that for exerting a given pressure, it is necessary to always first exert a higher pressure before the desired pressure is transmitted through the spring. In a switching device having the task to shut off the valve in a supply conduit to a reservoir to be filled automatically, for example, in a coffee machine, such a situation is undesirable, for certainly in the long run at varying spring characteristic, this may result in overflow of the reservoir. Besides, the known device is too complicated and expensive for it to be mounted in a product manufactured in series, such as a coffee machine.

Some embodiments of the valve control device according to the present invention will now be described, by way of example, with reference to the accompanying drawings, in which.

Figure 1:
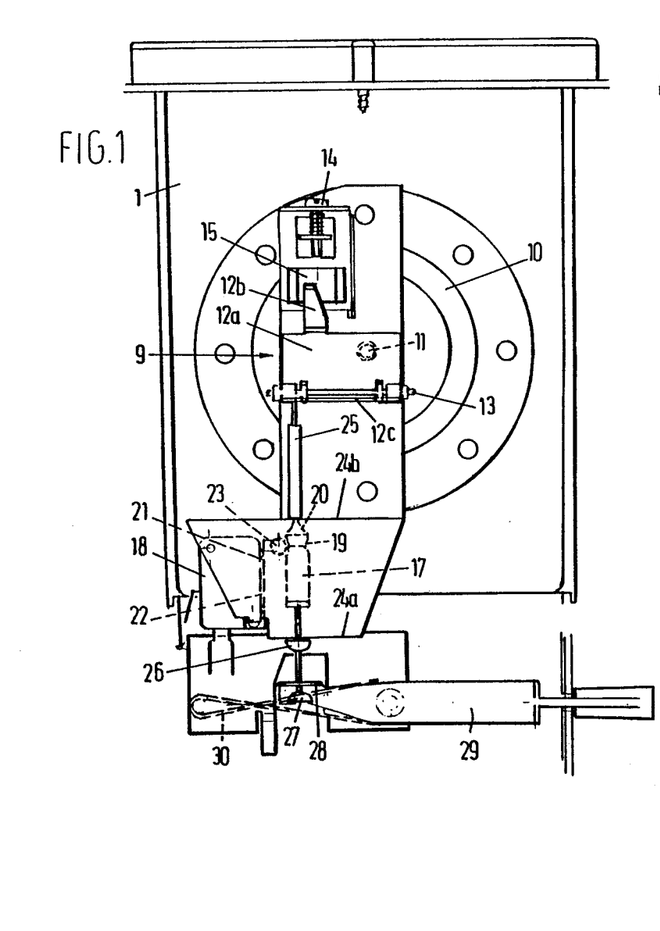
FIG. 1 is a side view of the water reservoir of a coffee machine.
Figure 3A:
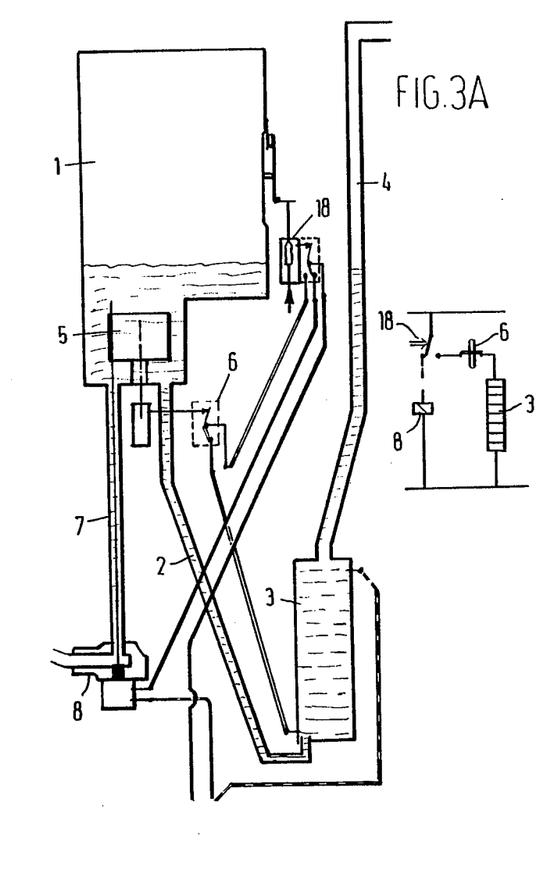
FIGS. 3A and 3B are diagrammatic representations of the essential parts of a coffee machine wherein the control device shown in FIGS. 2A, 2B is employed.
Figure 3B:
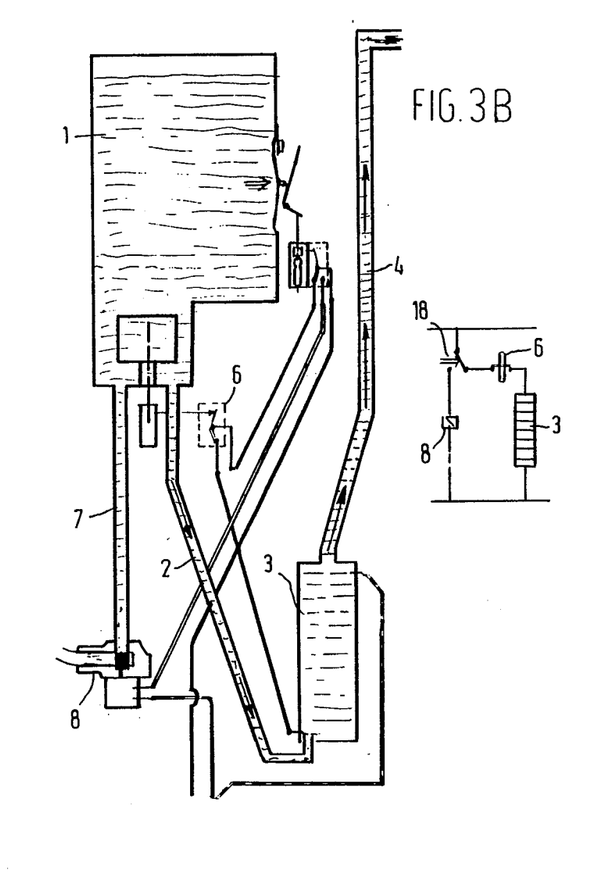

For making coffee, the water is heated in the through-flow heater 3 and hot water is poured over the ground coffee through the riser until the water level in reservoir 1 has dropped so far that a microswitch 6 controlled by a float 5 interrupts the current supply to the element of the through-flow heater.

For filling reservoir 1, this is connected by means of a supply conduit 7 incorporating an electromagnetic valve 8, to a supply of water, e.g. the water supply mains.

The automatic interruption of the water supply is effected by means of a control device 9 (see FIGS. 1, 2A, 2B) comprising a diaphragm 10 mounted in a wall of the reservoir 1 and having an operating stud 11, a right-angled tilting lever 12 with horizontal swivel shaft 13, a magnet 15 adjustable in height through an adjusting screw 14, a switching pin 16 with a cam member 17 and a microswitch 18. The right-angled lever 12 has an upwardly extending arm 12a with a projecting lip 12b and a laterally directed arm 12c.

Figures 2A, 2B:
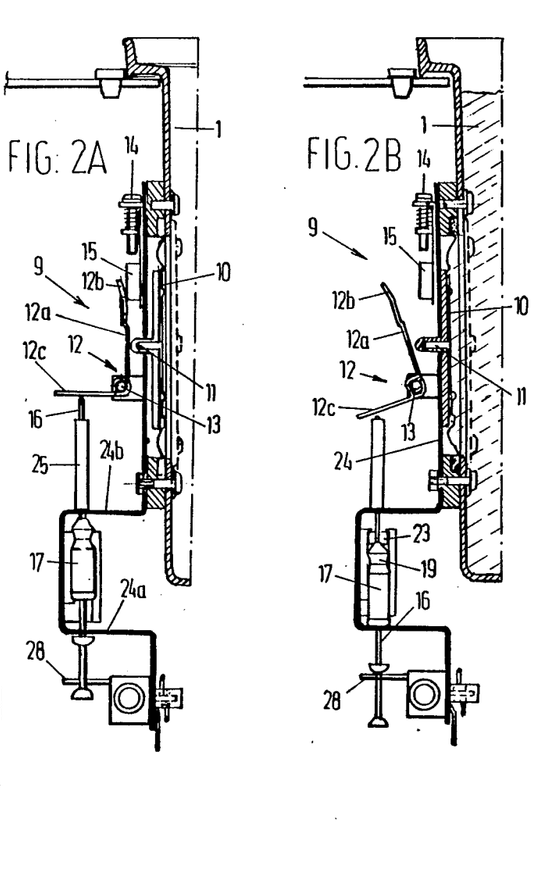
FIGS. 2A and 2B are side views of the control device of the valve in the water supply.

The active part of the cam member 17 is provided with an annular groove 19 and a tapering end 20. Microswitch 18 has a push knob 21 and a leaf spring 22 with, at its end, a follower roller 23 coacting with the cam member 17. When the follower roller lies in the groove 19, leaf spring 22 depresses push knob 21, and when the follower roller lies above the conical part 20 against the switching pin 16, leaf spring 22 does not load push knob 21, and the latter is in the extended position.

Bounded by cam member 17 being vertically confined between portions 24a, 24b of a frame 24, switching pin is arranged for limited axial movement between two end positions, the high position of which is determined by engagement of follower roller 23 in annular groove 19 and the low position by abutment of cam member 17 on the frame portion 24a.

The switching pin is vertically guided in frame portions 24a, 24b and extends through a loose stop sleeve 25. Pin 16 is further provided with two stops 26, 27.

Between these stops 26, 27 extends an end portion 28 of a switching lever 29. The arm of lever 29, having the end portion 28, is engaged between the free ends enclosing an acute angle of a bent spring 30 in such a manner that the lever is biased towards a mid-position, clear of stops 26, 27.

Switching pin 16 can be brought into the high position shown in FIG. 2A by means of the switching lever 29, so that the lip 12b of the right-angled lever is pressed against magnet 15, which retains the lever in this position. Also, the follower roller is introduced into annular groove 19, so that leaf spring 22 depresses push knob 21 of microswitch 18. In this situation, shown in FIG. 3A, the electromagnetic valve 8 is controlled microswitch 18 for admitting water via supply conduit 7 to reservoir 1. The current supply to the element of the through-flow heater 3 is then interrupted (see also electric diagram FIG. 3A).

As soon as the maximum filling level of reservoir 1, shown in FIGS. 2B and 3B, is reached, the hydrostatic pressure on diaphragm 10 is sufficient to press the arm 12a, c of lever 12 away from magnet 10 by means of stud 11 and to press the switching pin 16 downwards with lever arm 12c. As with increasing distance from magnet 10, the attraction thereof decreases progressively (degressive effect), the transmission of force by diaphragm 10 to the switching pin is not opposed in any whatever and the switching pin 16 can be pressed downwards so far until cam follower roller 23 is pressed out of the annular groove and can roll over the conical portion 20 of cam member 17 up to the position shown in FIG. 2B. Further downward swivelling of the right-angled lever 12 is prevented by bush 25. In the low position of switching pin 16, leaf spring 22 is clear of push knob 21, so that the microswitch (see diagram FIG. 3B) interrupts the current supply to electromagnetic valve 8, while current is supplied to the element of the through-flow heater 3, and thus water is withdrawn from reservoir 1 with heating and is poured above the coffee filter.

When the filling of reservoir 1 has to be interrupted, e.g. because only a half-filled reservoir is needed, this can be effected by lifting the switching pin by means of lever 29 as soon as the desired water level is reached.

Figure 4:
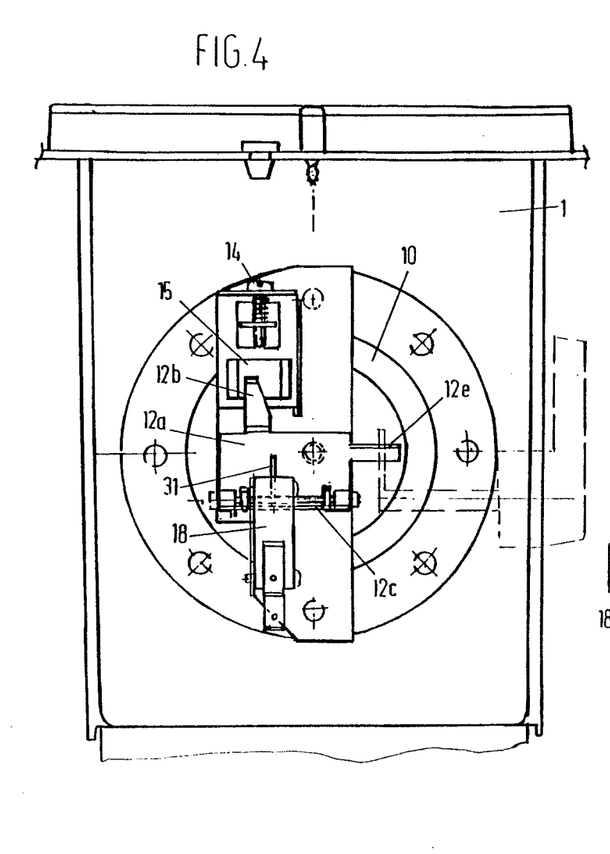
FIG. 4 is a side view of the water reservoir of a coffee machine and shows the control device in a first variant embodiment.
Figure 4A:
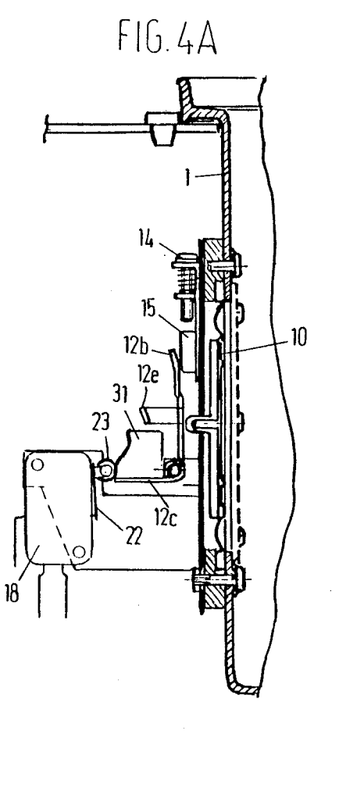
FIGS. 4A and 4B are side views of the control device shown in FIG. 4.
Figure 4B:
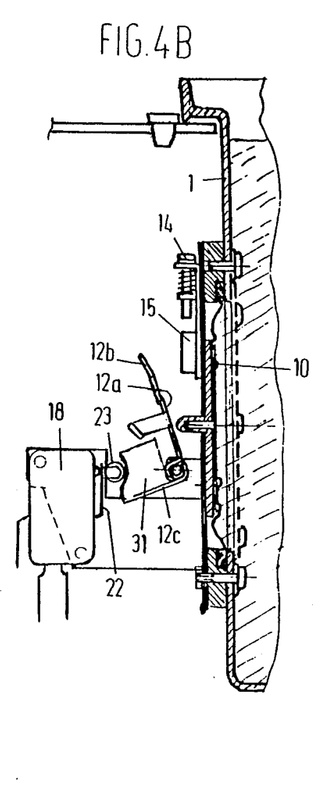

In the first variant embodiment of the control device shown in FIGS. 4, 4A and 4B, the tilting movement of lever 12 is transmitted not via a switching pin with a cam member, but direct to follower roller 23 near microswitch 18 by an operating member in the form of a control cam 31 on lever arm 12c, with the position of control cam 31 being adjustable to the position of microswitch 18 directly beside lever 12.

Figure 5:
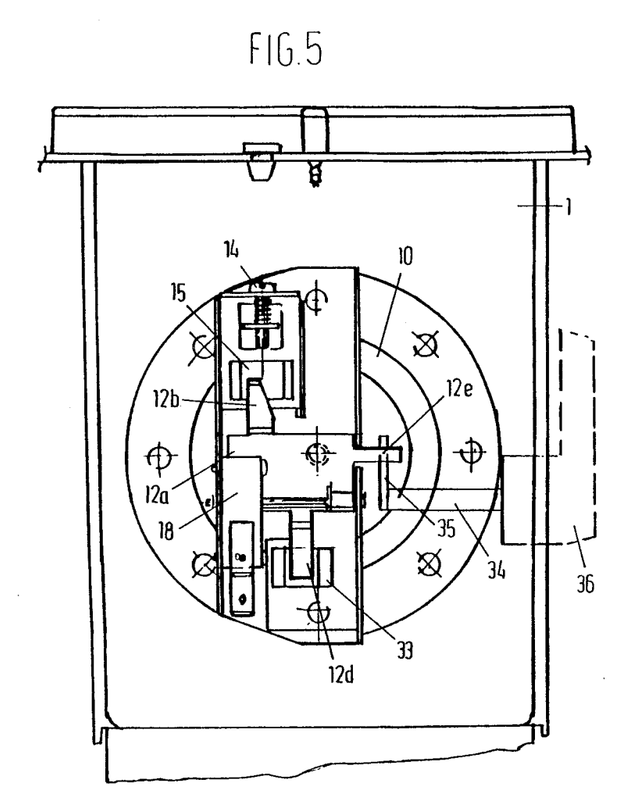
FIG. 5 is a side view shown in FIG. 4 of a water reservoir with a second variant embodiment of the control device.
Figure 5A:
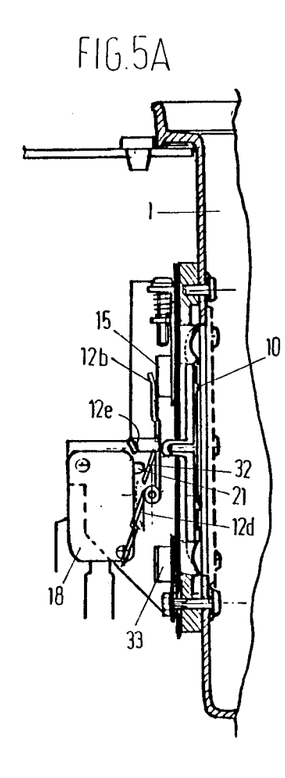
FIGS. 5A and 5B are side views of the control device shown in FIG. 5.
Figure 5B:
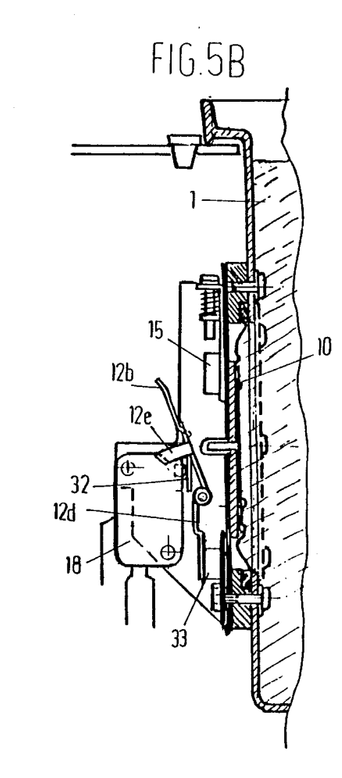

In the second variant embodiment shown in FIGS. 5, 5A and 5B, tilting lever 12 is fitted with an operating member in the form of a portion 32 projecting from lever arm 12a, which portion, upon tilting movement of lever 12, directly acts on push knob 21 of microswitch 18. Lever 12 is also provided with a downwardly extending lip 12d, which when the lever tilts is attracted and retained by a second magnet 33.

For manually resetting the tilting lever 12 from the position shown in FIGS. 4B and 5B to the first end position shown in FIGS. 4A and 5A, use can be made of a switching device shown in FIGS. 6, 7, 8A and 8B.

Figures 6, 7:
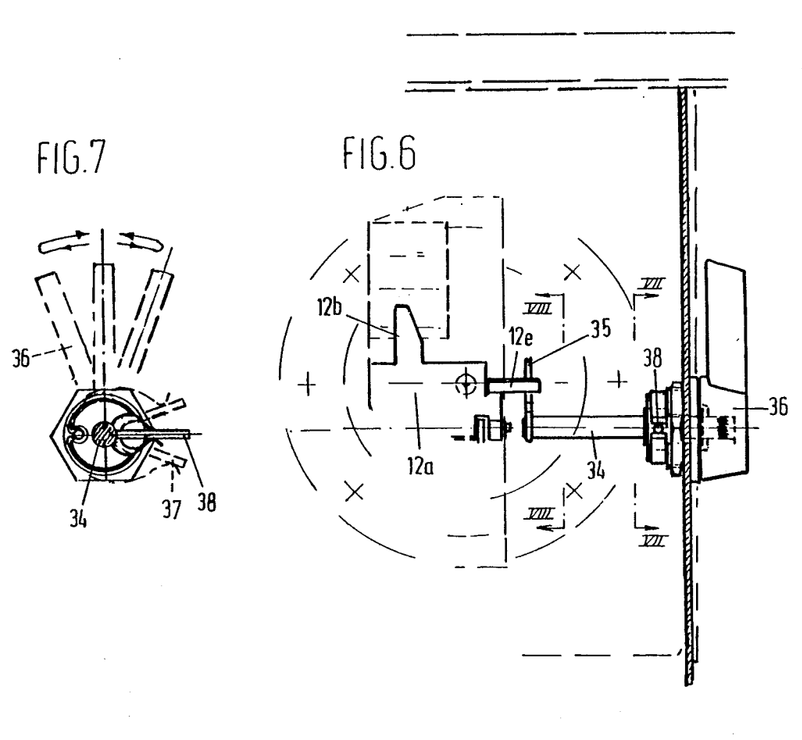
FIG. 6 is a diagrammatic side view of a hand-operated switching device for use in the control devices shown in FIG. 4 and FIG. 5.
FIG. 7 is an elevational view according to the arrow VII—VII of FIG. 6.
Figure 8A:
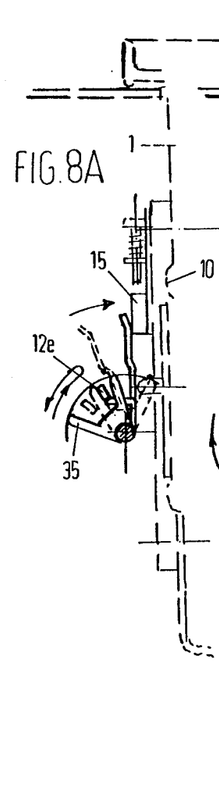
FIGS. 8A and 8B are elevational views according to the arrow VIII—VIII of FIG. 6 and show the double function of the switching device shown in FIG. 6.
Figure 8B:
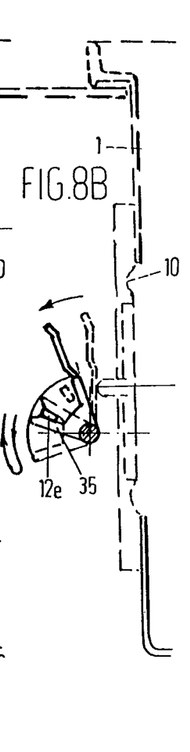

As appears from FIG. 6 and also from FIG. 5, lever arm 12a has a carrier portion 12e extending between a forked end portion 35 of a switch shaft 34 operable by a knob 36. Shaft 34 has a cross pin 38 coacting with the free ends of a bent spring 37 for returning switch shaft 34 to the mid-position shown in FIG. 7 after it has performed a rotary movement.

Figure 9:
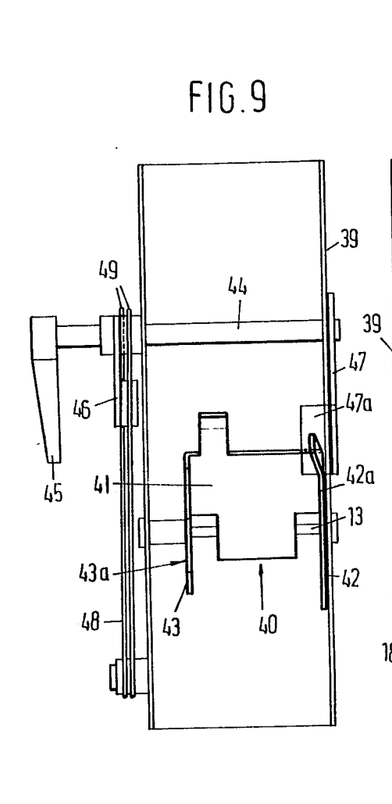
FIGS. 9–9C show a preferred embodiment of the control device in front view, side view and perspective view, respectively. The FIGS. 1, 3A and 3B show a water reservoir 1 connected via a conduit 2 to a riser 4 fitted with an electric through-flow heater 3, said riser terminating at its top over a filter funnel with ground coffee, not further shown.
Figure 9A:
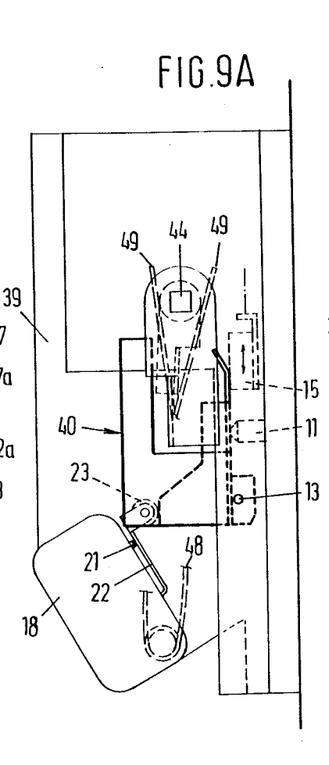
Figure 9B:
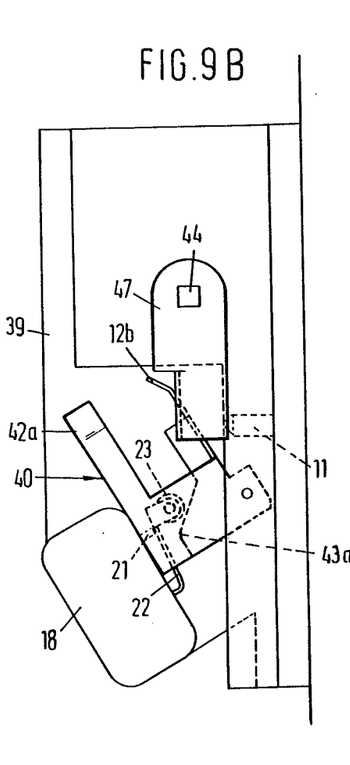
Figure 9C:
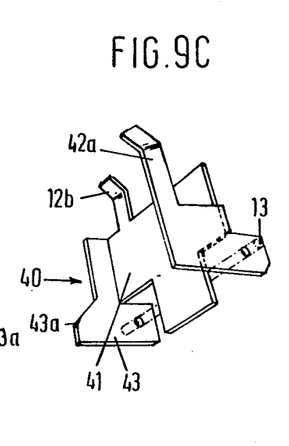

In the preferred embodiment of the present invention shown in FIGS. 9A-9C, the control device with microswitch 18 is designed as an integrally mountable member having an open troughed housing 39 in which tilting member 40 is journalled via a swivel shaft 13. Tilting member 40 (see FIG. 9C) has a rear wall 41 with a projecting lip 12b adapted for coaction with magnet 15. Member 40 is further provided with side walls 42 and 43, side wall 43 having an edge portion 43a adapted for coaction, as a camming surface, with cam follower roller 23 of microswitch 18. The other side wall 42 has a lip 42a extending upwardly, at an interspace from rear wall 41, the purpose of which will be described hereinafter.

FIG. 9A shows the tilting member 40 in one stable end position wherein the lip 12b is retained by magnet 15. The diaphragm 10, not shown, is not or insufficiently loaded for it to be able to swivel the tilting member away from the magnet by means of the operating stud 11. Cam follower roller 23 of the microswitch is maintained pressed towards the microswitch 18 by the camming surface 43a of the tilting member, so that push knob 21 of the microswitch is maintained in the depressed position by spring 22 (the situation is comparable to that shown in FIGS. 2A, 4A and 5A). As soon as the water level behind diaphragm 10 has reached the desired value, operating stud 11 presses the tilting member 40 away from the magnet 15 and the tilting member moves towards the other stable end position shown in FIG. 9B, whereby the cam follower roller 23 is released by camming surface 43a, so that push knob 21 of microswitch 18 can move to the extended position (according to FIGS. 2B, 4B and 5B).

For manual operation of the tilting member 40 use is made of a switch shaft 44 with hand grip 45, two preferably identical switch pawls 46, 47 and a bent spring 48 with free ends 49 enclosing an acute angle.

Switch pawl 46, in conjunction with the free spring ends 49, has the function to return the switch shaft with hand grip 45, after each operating movement, to a midposition.

The other switch pawl 47 has a flanged carrier portion 47a extending between rear wall 41 and the lip 42a extending upwardly from the side wall 42 of the tilting member 40, so that rotation of the switch shaft 44 via hand grip 45 results in the carrier portion 47a abutting either against lip 42a, or against the rear wall 41 of tilting member 40.

The embodiment of the control device shown in FIGS. 9A–9C has the simplest construction for, besides magnet 15 and switch shaft 44 with hand grip 45, the return spring 48 and two possibly identical switch pawls 46, 47, this embodiment only comprises a troughed housing 39 to be manufactured from sheet metal in a simple manner with a swivel shaft 13 and a tilting member 40 to be manufactured from one piece of sheet metal by punching and bending.

I claim:

1. A valve control device for a coffee machine of the type including water supply conduit coupled thereto and a valve for controlling flow therein, the reservoir having a wall, said valve control device comprising a diaphragm capable of being disposed in said wall, stud means operably coupled to said diaphragm for movement thereby, a tilting member arranged proximate said stud means, a control circuit for operating the valve and bistable switch means in said control circuit, means mounting said tilting member for swivelling movement about a swivel axis between first and second positions, said first position being in the path of movement of said stud means and said second position operably coupled to said switch means and magnetic means for retaining said tilting member in said first position until overcome by movement of said stud means enabling movement of said tilting member to said second position.

2. A valve control device according to claim 1 in which there is provided means interposed between said tilting member and said bistable switch means effective for converting movement to said second position of said tilting member into operating movement of said bistable switch means, said means comprising a switch pin and means guiding said switch pin for axial movement between two levels, cam means carried by said switch pin and operably coupled to said bistable switch means at one level and disengaged therefrom at the other lever, said switch pin capable of being moved manually between said levels.

3. A valve control device according to claim 2 including a through-flow heater having a heating element, and said bistable switch means capable of effecting energizing of the heating element when said switch pin is at the other level.

4. A valve control device according to claim 2 in which said tilting member comprises a right angled lever having one arm extending substantially vertically at said first position proximate said magnet means and the other arm extending horizontally over said switch pin.

5. A valve control device according to claim 3 in which said tilting member comprises a right angled lever having one arm extending substantially vertically at said first position proximate said magnet means and the other arm extending horizontally over said switch pin.

6. A valve control device according to claim 2, 3, 4 or 5 in which said cam means includes a cam follower roller and a leaf spring having one end, said cam follower being mounted at said one end for exerting force on said bistable switch, said cam means further including an annular groove and said cam follower being disposed in said annular groove when said switch pin is at said other level and retained thereat by said leaf spring.

7. The valve control device according to claims 2, 3, 4 or 5 in which said valve includes a switch lever having one end extending in the path of said switch pin, said switch pin being provided with two stops, said one end of said switch lever extending between said stops, said switch lever being pivotal about a horizontal axis and spring means biasing said switch lever towards a position between said stops and clear thereof.

8. The valve control device according to claims 2, 3, 4 or 5 in which said valve includes a switch lever having one end extending in the path of said switch pin, said switch pin being provided with two stops, said one end of said switch lever extending between said stops, said switch lever being pivotal about a horizontal axis and spring means biasing said switch lever toward a position between said stops and clear thereof and said switch means including a bent spring having free ends enclosing an acute angle and said one end of said switch lever being located between said free ends.

9. A valve control device according to claims 2, 3, 4 or 5 in which said magnet means comprise a magnet mounted for slidable movement toward and away from the swivel axis of said tilting member.

10. A valve control device according to claim 1 in which said bistable switch means comprises a microswitch having a push knob capable of operating same and means for converting the swivelling movement of said tilting member into an operating movement of said microswitch and including an operating member connected to said tilting member, said operating member engaging said push knob of said microswitch.

11. A valve control device according to claim 10 in which said operating member comprises a control cam, a cam follower roller and a leaf spring, said leaf spring having an end and said cam follower roller being mounted on said end, said cam follower roller cabable of exerting force on said push knob sufficient to operate said microswitch.

12. A valve control device according to claim 11 in which said operating member comprises a projecting portion on said tilting member, said projecting portion disposed directly to engage said push knob to depress same, and second magnet means disposed at said second position for retaining said push knob in depressed condition.

13. A valve control device according to claims 10, 11 or 12 and a carrier portion provided on said tilting member, said carrier portion being in spaced parallel position relative to the swivelling axis of said tilting member, said microswitch having a shaft rotatable reciprocally from a mid-position and spring means for biasing said shaft against said reciprocal rotatable movement.

14. A valve control device according to claim 10 and an open troughed housing including an assembly of at least a rear wall and a pair of side walls, said tilting member comprising said assembly, a pivot shaft journalled between said side walls, one of said side walls having a free edge region, a leaf spring and a cam follower roller, said bistable switch means comprising a microswitch mounted in the housing, said free edge region including a camming surface for said cam follower roller, said cam follower roller being connected to said microswitch by way of said leaf spring.

15. A valve control device according to claim 14 comprising a switch shaft accommodated within said housing, said switch shaft having a hand grip, first and second switch pawls carried by said switch shaft, a return spring operating in conjunction with one of said first and second switch pawls for loading said switch shaft in a mid-position, a lip formed on one of said side walls and extending upwardly therefrom, a carrier portion formed on the other of said first and second switch pawls and engaging said tilting member with clearance between said rear wall and said lip spaced from said rear wall.

* * * * *

UNITED STATES PATENT AND TRADEMARK OFFICE
CERTIFICATE OF CORRECTION

PATENT NO. : 4,713,526
DATED : December 15, 1987
INVENTOR(S) : Gerard C. Smit

It is certified that error appears in the above-identified patent and that said Letters Patent are hereby corrected as shown below:

| | |
|---|---|
| Col. 2, line 31 | Correct "point", should be --pin--. |
| Col. 3, line 32 | Correct "position" should be --portion--. |
| Col. 3, line 52 | Correct "swivel", should be --switch--. |
| Col. 5, line 58 | After "controlled" insert -- via --. |
| Col. 6, line 3 | After "any", insert --way--. |
| Col. 8, line 59 | Correct "cabable", should be --capable--. |

Signed and Sealed this

Twenty-fourth Day of May, 1988

Attest:

DONALD J. QUIGG

Attesting Officer

Commissioner of Patents and Trademarks